(12) United States Patent
Bo et al.

(10) Patent No.: US 9,252,601 B2
(45) Date of Patent: Feb. 2, 2016

(54) METHOD FOR CONTROLLING A POWER CONVERTER IN A WIND TURBINE GENERATOR

(75) Inventors: Yin Bo, Singapore (SG); Heng Deng, Singapore (SG); Kim B. Larsen, Hadsund (DK); Lars Helle, Suldrup (DK); Mogens Lau, Silkeborg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 387 days.

(21) Appl. No.: 13/498,109

(22) PCT Filed: Sep. 20, 2010

(86) PCT No.: PCT/SG2010/000350
§ 371 (c)(1),
(2), (4) Date: Sep. 19, 2012

(87) PCT Pub. No.: WO2011/037537
PCT Pub. Date: Mar. 31, 2011

(65) Prior Publication Data
US 2013/0010505 A1 Jan. 10, 2013

Related U.S. Application Data

(60) Provisional application No. 61/246,536, filed on Sep. 29, 2009.

(30) Foreign Application Priority Data

Sep. 24, 2009 (DK) .................................. 2009 70124

(51) Int. Cl.
*H02M 5/42* (2006.01)
*H02J 3/38* (2006.01)

(52) U.S. Cl.
CPC ............... *H02J 3/386* (2013.01); *Y02E 10/763* (2013.01)

(58) Field of Classification Search
CPC ..... Y02E 10/763; Y02E 10/563; Y02E 40/32; Y02E 10/723; Y02E 10/725; H02P 21/0035; H02P 9/42; F05B 2270/337; H02J 3/40; H02J 3/386; H02J 3/38
USPC .......................................... 290/44, 55, 40 B
See application file for complete search history.

(56) References Cited

U.S. PATENT DOCUMENTS 5,083,039 A * 1/1992 Richardson et al. ............ 290/44
6,052,297 A * 4/2000 Akamatsu et al. .............. 363/84

(Continued)

FOREIGN PATENT DOCUMENTS

WO  9927629 A1  6/1999
WO  03038970 A2  5/2003
WO  WO 2008055499 A2 * 5/2008 ............ G01R 19/25

OTHER PUBLICATIONS

Danish search report for application No. PA200970124 dated Apr. 29, 2010.

*Primary Examiner* — Tulsidas C Patel
*Assistant Examiner* — Viet Nguyen
(74) *Attorney, Agent, or Firm* — Patterson & Sheridan, LLP (57) ABSTRACT

A method for controlling a power converter in a wind turbine generator, the power converter being connected to a power grid, the method comprising obtaining an alternating current (AC) line voltage at a connection point between the power converter and the power grid, obtaining a frequency of the power grid based on the AC line voltage, dynamically adapting the AC line voltage to the frequency of the power grid, generating a reference signal based on at least the frequency-adapted AC line voltage, and determining a converter control signal to be provided to the power converter based on the reference signal and the grid frequency in order to generate a power at the frequency of the power grid. Further, a wind turbine generator implementing the method is provided.

20 Claims, 5 Drawing Sheets

(56) References Cited

U.S. PATENT DOCUMENTS

| | | | |
|---|---|---|---|
| 6,222,335 B1* | 4/2001 | Hiti et al. | 318/432 |
| 6,288,515 B1* | 9/2001 | Hiti et al. | 318/722 |
| 6,326,750 B1* | 12/2001 | Marcinkiewicz | 318/432 |
| 7,751,211 B2* | 7/2010 | Yuzurihara et al. | 363/127 |
| 8,575,915 B2* | 11/2013 | Kerkman et al. | 324/76.77 |
| 2002/0030365 A1* | 3/2002 | Underwood et al. | 290/40 B |
| 2003/0151259 A1* | 8/2003 | Feddersen et al. | 290/44 |
| 2005/0046370 A1* | 3/2005 | Gallegos-Lopez et al. | 318/434 |
| 2009/0085354 A1* | 4/2009 | Tan et al. | 290/44 |
| 2009/0147540 A1* | 6/2009 | Conticelli et al. | 363/7 |
| 2009/0244937 A1* | 10/2009 | Liu | 363/46 |
| 2010/0213925 A1* | 8/2010 | Teodorescu et al. | 324/76.78 |
| 2011/0163546 A1* | 7/2011 | Gupta | F03D 7/0272 290/44 |

* cited by examiner

METHOD FOR CONTROLLING A POWER CONVERTER IN A WIND TURBINE GENERATOR

TECHNICAL FIELD

The present invention relates to a method of controlling a power converter in a wind turbine generator, more specifically to a method of controlling a power converter in a wind turbine generator that is connected to an electric power transmission grid.

BACKGROUND OF THE INVENTION

Wind turbines are used to convert wind energy to electrical energy in a sustainable and environmentally-friendly way. The use of wind turbines is gaining widespread acceptance in their role of providing alternative energy, and the installed capacity of wind turbine power generation has increased dramatically over the past decade.

As such, there are efforts being made to tighten up the electrical power grid requirements, in order to streamline the differing standards of different manufacturers, and to allow wind turbine generators to operate as conventional power generation systems, e.g. oil and gas plants, hydro-electric power plants, nuclear, etc. In various countries, the grid code standards have been revised and have called for more stringent requirements to be met.

Within such grid code standards are the requirements of operation in the presence of negative sequence voltages and operation within a wide frequency range. For example, some localities provide a standard of continuous operation within a 3% negative sequence voltage, i.e. the wind turbine should be able to withstand a maximum negative sequence voltage of 3% in the grid before connection. Also, most countries' grid codes call for operation of the power generation system within a range of frequencies around the operating fundamental frequency of the power grid.

Negative sequence voltages may arise from a system of voltage imbalances. In a power grid with a balanced sinusoidal system, the three line-neutral voltages are equal in magnitude and its phases are displaced from each other by 120 degrees. Any differences that exist in the three voltage magnitudes and/or a shift in the phase separation from 120 degrees is said to give rise to an unbalanced supply. Possible causes of an unbalanced system are perhaps unequal impedances of three-phase transmission and distribution lines, or many other possible reasons.

An unbalanced system can then be broken down into positive sequence voltages and negative sequence voltages. Positive sequence voltages are associated with a positively rotating field, while the negative sequence voltages are associated with a negatively rotating field. It is well known that an unbalanced supply voltage consisting both positive and negative sequence components will typically give rise to a DC link voltage variation at twice the line frequency if the grid current only has positive sequence components. The presence of ripple on the DC link voltage will affect control effectiveness on the machine side converter. In addition, it in turn may lead to asymmetry and distortion in the grid currents which might give rise to grid code incompliance issues.

With regard to frequency variation, the instantaneous frequency at any time may vary a few percent in either direction of the fundamental frequency, which is defined as either 50 Hz or 60 Hz depending on the country of installation. Usually in case of overproduction on a grid, the grid frequency rises and in case of underproduction, grid frequency falls. For countries with power grids operating at a fundamental frequency of 50 Hz, most grid codes require grid frequency operation within a range of 47-53 Hz. For countries with power grids operating at a fundamental frequency of 60 Hz most grid codes require grid frequency operation within a range 57-61.7 Hz. In this case, if the components inside WTG are not well designed, they could be damaged by operating at a frequency range other than desired one. On the other hand, if the current control is designed for operation at a certain frequency, it may not achieve a good performance when running at other frequencies.

Various implementations have been proposed to operate power systems to operate in the presence of negative sequence voltages, but solutions currently known are relatively complicated.

For example, U.S. Pat. No. 6,052,297 describes a power conversion apparatus to control the current of the power converter in a positive sequence synchronously rotating d-q frame (SRF) and a negative sequence synchronously d-q frame to account for the positive sequence voltages and the negative sequence voltages respectively. There is no teaching of accommodating a varying grid frequency. As taught in this publication, in order to achieve good performance in such a situation through current control, four PI controllers should be implemented to regulate positive sequence currents in positive sequence-SRF and negative sequence currents in negative sequence SRF separately. However, such a scheme would require four separate PI current controllers, in addition to feed forward and decoupling elements. This leads to undesired complexity. Besides complexity, sequence component extracting filters are required to be employed which undermine the overall regulator bandwidths and stability margins.

It is thus an object of the present invention to provide a method and a system for controlling a power converter in a wind turbine generator which is less complex than that which is known, as well as to satisfy one or more of the newly provided grid requirements as described above.

SUMMARY OF THE INVENTION

According to a first aspect of the invention, there is provided a method for controlling a power converter in a wind turbine generator, the power converter being connected to a power grid, the method comprising obtaining an alternating current (AC) line voltage at a connection point between the power converter and the power grid, obtaining a frequency of the power grid based on the AC line voltage, dynamically adapting the AC line voltage to the frequency of the power grid, generating a reference signal based on at least the frequency-adapted AC line voltage, and determining a converter control signal to be provided to the power converter based on the reference signal and the grid frequency in order to generate a power at the frequency of the power grid.

The provision of such a method allows the wind turbine generator to operate in accordance to the power grid at which is connected to, which may have its fundamental frequency fluctuate in accordance to varying loads. Having such a capability ensures that the wind turbine generator stays connected and continues to provide power at a frequency equal to that of the connected power grid. Further, the above described method is easily implemented, as will be described in the embodiments below, and does not involve much complexity or the introduction of additional hardware components which may affect system performance.

According to another embodiment of the present invention, the converter control signal determination is carried out in a stationary coordinate frame. Under an asymmetrical grid voltage, the line current magnitudes and phases are adjusted such that constant instantaneous power is transferred to the direct current (DC) side. According to symmetrical component theory, this will result in unbalanced alternating current (hereinafter defined as AC for sinusoidal signals) line currents which have both positive and negative sequence components.

Traditionally, in order to achieve good performance in such a situation through current control, four PI controllers should be implemented to regulate positive sequence currents in positive sequence synchronously rotating frame (SRF) and negative sequence currents in negative sequence SRF separately, e.g., dual current control (see above mentioned U.S. Pat. No. 6,052,297 as an example). As mentioned above, this leads to undesired complexity and the unnecessary addition of components, which are not necessary when determining the signal in a stationary coordinate frame.

In an embodiment of the invention, the reference signal comprises AC signals. It is noted that both positive- and negative-sequence components become 50/60 Hz AC terms in the stationary coordinate frame of reference. If the currents are controlled in the stationary frame, the control becomes an AC tracking problem under unbalanced supply operation. Only two current controllers are required and extraction of sequence components is also not necessary. Thus, it is advantageous to develop a high performance AC controller in the stationary frame which can achieve zero steady-state error while tracking the input currents according to the desired frequency waveforms.

According to one embodiment, no coordinate transformation is carried during the step of determining of the converter control signal from the reference signal and the grid frequency. The signals in the AC controller are thus controlled in the stationary frame, and sequence separation units are avoided in the current feedback loop, which improves the stability margin of current control.

In an embodiment of the invention, the AC current control unit is a P+Resonant current controller with a varying resonant frequency. A traditional P+Resonant current controller can only provide infinite/high gain for a pre-set frequency. Operation of a traditional P+Resonant current controller under varying grid frequency will deteriorate control performance. A P+Resonant current controller with a varying resonant frequency has the capability of completely eliminating an error in an alternating parameter as long as the parameter alternates with a frequency close to the center frequency. Therefore, the need for performing the transformation into a rotating frame is eliminated.

According to one embodiment of the invention, the reference signal comprises an error signal generated based on a difference between a current reference and an actual AC current obtained at the connection point between the power converter and the power grid. The error signal is preferably minimized such that the grid current is delivered as required. Current control is used because of direct current regulation and easy over-current protection.

According to another embodiment, the current reference is determined based on an active reference and a reactive reference. The active reference and reactive reference provide a requirement of the active and reactive power that is to be supplied to the power grid.

According to one embodiment, the active reference is generated using a feedback controller, e.g. a proportional-integral (PI) controller with an input signal based on a difference between a function of a reference DC voltage and a function of an actual DC voltage. In a further embodiment, the feedback controller comprises a PI controller. Utilizing a PI controller provides a feedback control that allows steady-state error to be zero, i.e. the reference signal matches the required reference DC voltage.

According to one embodiment, the active reference is an active power reference or an active current reference.

In an embodiment of the present invention, positive sequence components and negative sequence components of the AC line voltage are determined. Obtaining and utilizing the grid frequency provides the wind turbine with frequency adaptivity, i.e. operation within a narrow fluctuation of frequencies. To cluster the operational requirements of identifying the positive and negative sequence voltages and frequency estimation allows for streamlining of the control flow.

According to an embodiment of the invention, the positive and negative sequence components are used in generating a reference signal, for example, a current reference. In a further embodiment, the current reference is generated in a stationary coordinate frame. This reduces the need for complex coordinate transformation.

In another embodiment, the positive sequence and negative sequence components are determined using an integrator and the grid frequency is generated using a Phase-Locked Loop (PLL). In one embodiment, the positive sequence and negative sequence components are determined with a dual second order generalized integrator for quadrature signals generation.

In one embodiment of the invention, the converter control signal is passed to a pulse-width-modulation (PWM) module before being provided to the power converter.

According to a second aspect of the invention, there is provided a method for controlling a power converter in a wind turbine generator, the method comprising obtaining an AC line voltage at a connection point between the power converter and the power grid, determining positive sequence components and negative sequence components of the AC line voltage, generating a current reference based on at least the positive sequence components and the negative sequence components, and determining a converter control signal to be provided to the power converter based on the current reference, and wherein the current reference is generated in a stationary coordinate frame.

The method allows for the continuous connection of the wind turbine generator to the power grid, which may experience an unbalanced supply voltage. Having such a capability ensures that the wind turbine generator provides smooth power to the grid despite the unbalanced voltage. Typically, an unbalanced supply voltage will typically give rise to a dc link voltage variation at twice the line frequency. Such variations are undesired and affect the output of the wind turbine generator. According to the above method, the wind turbine is able to detect any voltage imbalance and react accordingly to the imbalance.

According to a third aspect of the invention, there is provided a wind turbine generator, comprising an electrical generator, a power converter, the power converter being connected between the electrical generator and a power grid, and a control unit for controlling the power converter, the control unit comprising a measurement unit for obtaining an AC line voltage at a connection point between the power converter and the power grid, a grid synchronization unit for obtaining a frequency of the power grid based on the AC line voltage, a current reference generation unit for generating a reference signal based on at least the AC line voltage, and an AC current control unit for determining a converter control signal based on the reference signal and the grid frequency for controlling the power converter.

According to a fourth aspect of the invention; there is provided a computer readable medium having a computer program recorded thereon, the computer program comprising instructions which, when executed by a processor, make the processor perform a method for controlling a power converter in a wind turbine generator, comprising obtaining an AC line voltage at a connection point between the power converter and the power grid, obtaining a frequency of the power grid based on the AC line voltage, generating a reference signal based on at least the AC line voltage, and determining a converter control signal to be provided to the power converter based on the reference signal and the grid frequency.

DETAILED DESCRIPTION

Figure 1:
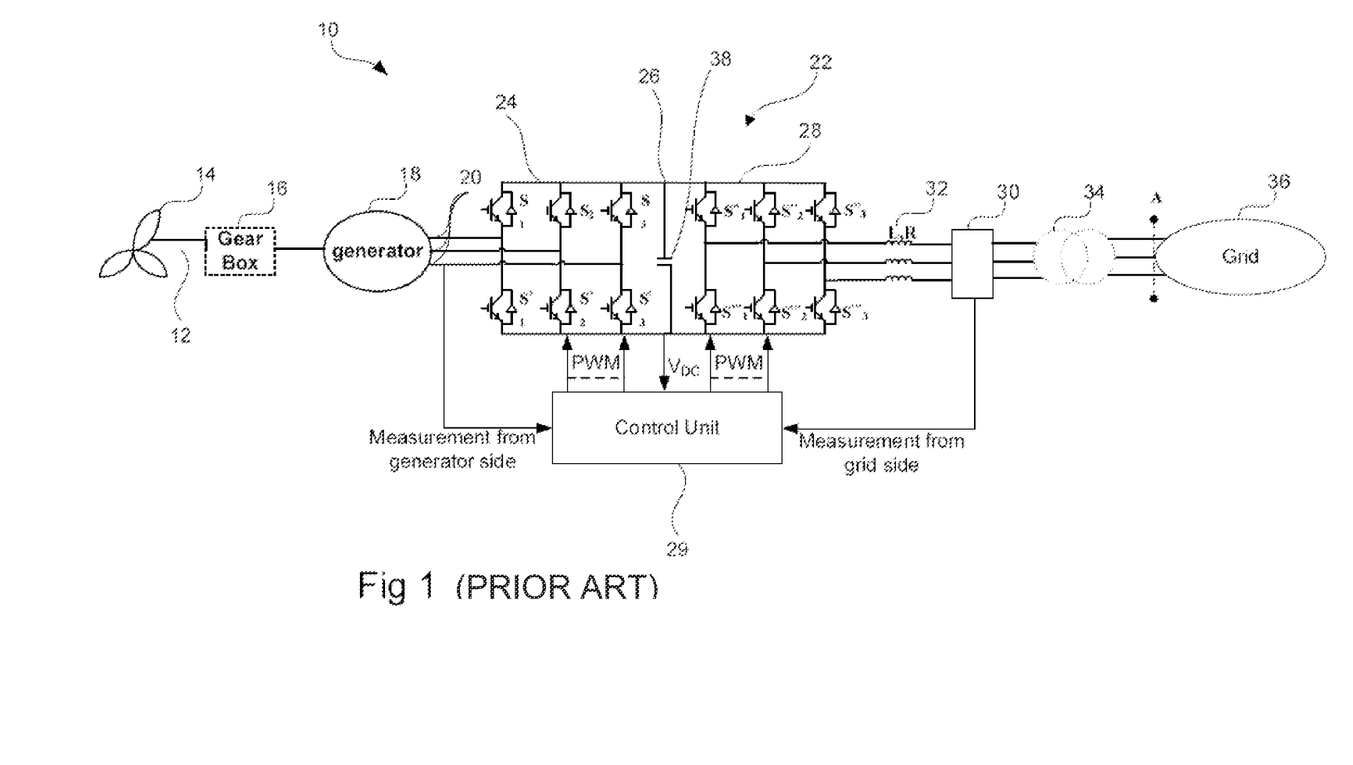
FIG. 1 illustrates a general topology of an electrical system in a full scale wind turbine generator.

FIG. 1 illustrates a general topology of an electrical system in a full scale wind turbine generator 10. It should be noted that the invention is not limited to a full scale system, and may similarly be implemented in doubly-fed systems, or any other kind of electrical systems for wind turbine generators in other embodiments.

The wind turbine 10 comprises a drive shaft 12 connected to one or more adjustable blades 14. Any number of blades 14 may be used, but typically three blades 14 are used. The wind turbine 10 may be rotated in a substantially horizontal axis to allow the blades 14 to face in or out of the wind. The pitch of the blade 14 may also be adjusted to increase or reduce the amount of wind energy captured by the blade 14. Pitching adjusts the angle at which the wind strikes the blades 14. The drive shaft 12 is connected to a rotor of a generator 18 via a gear box 16. The generator 18 may be a singly or doubly-fed synchronous generator, a permanent magnet generator, an induction generator or any other type of generator comprising a stator winding. The gear box 16, if present, steps up the low rotational speed of the drive shaft 12 to a higher speed more suitable for the generator 16. The rotational speed of the drive shaft 12 is typically in the range of 10-20 revolutions per minute. The rotational speed of the rotor of the generator 18 is typically significantly higher. The optimum rotational speed of the rotor of the generator 18 depends on the internal characteristics and type of the generator 18 and may vary according to the number of poles of the generator 18. It is also possible to omit the gear box 16 by using an appropriate multi-pole generator 18 suitable for a slow rotational speed. In this case, the drive shaft is directly coupled to the generator 18.

To allow a variable speed of the drive shaft 12, an AC-AC converter 22 is arranged between the output terminals 20 of the generator 18 and the grid input terminals A. The converter 22 comprises a stator-connected converter 24 operating as an active pulse-width-modulated (PWM) rectifier comprising six electronic switches S1, S2, S3, S1', S2', S3'. The stator-connected converter 24 rectifies the AC power from the generator to DC power, which in turn feeds a DC link 26. The DC link 26 includes a capacitor 38. The capacitor 38 is used for smoothing DC power on the DC link 26. The DC link 26 feeds DC power to the grid-connected or grid-side converter 28 operating as an inverter. The grid-side converter 28 also comprises six electronic switches S1", S2", S3", S1''', S2''', S3'''. It should be noted that any number of switches may be present within the converters 24, 28, as is well-known in the art.

A control unit 29 controls the individual electronic switches in converters 24, 28. As illustrated in FIG. 1, the control unit 29 obtains measurements as inputs from the generator output terminals 20 as well as the grid input terminals A, and controls the stator-connected converter 24 and the grid-side converter 28 using pulse-width modulation. The control unit 29 may be a power controller with processing power, such as computers, microprocessors, microcontrollers, digital signal processing (DSP) boards, Application Specific Integrated Circuits (ASICs) or any others.

The electronic switches S1, S2, S3, S1', S2', S3', S1", S2", S3", S1''', S2''', S3''' may comprise power semiconductor switches such as e.g. Metal Oxide Semiconductor Field-Effect Transistors (MOSFETs), Gate Turn Off Thyristors (GTOs), Insulated Gate Bipolar Transistors (IGBTs), Bipolar Junction Transistors (BJTs), or thyristors. The grid-side converter 28 may thus be used to provide power to the power grid 36. The control unit 29 may be connected to a measurement unit 30 which measures the current and voltage from the grid input terminals A. A grid choke 32 or alternatively converter impedance may be arranged between the grid-side converter 28 and the grid input terminals A. The grid choke 32 may comprise a converter inductance L and a converter resistance R. The grid input terminals A may either be directly connected to the grid or through a transformer 34. The nominal frequency of the grid is either at 50 Hz or 60 Hz depending on the country of installation of the wind turbine.

As mentioned above, an issue in the control of the electrical power generation of a wind turbine generator is the ability to conform to the power grid it is connected to, i.e. there must be synchronization between the power signals from the wind turbine generator and the power grid, in order to stay actively connected under generic operating conditions.

Figure 2:
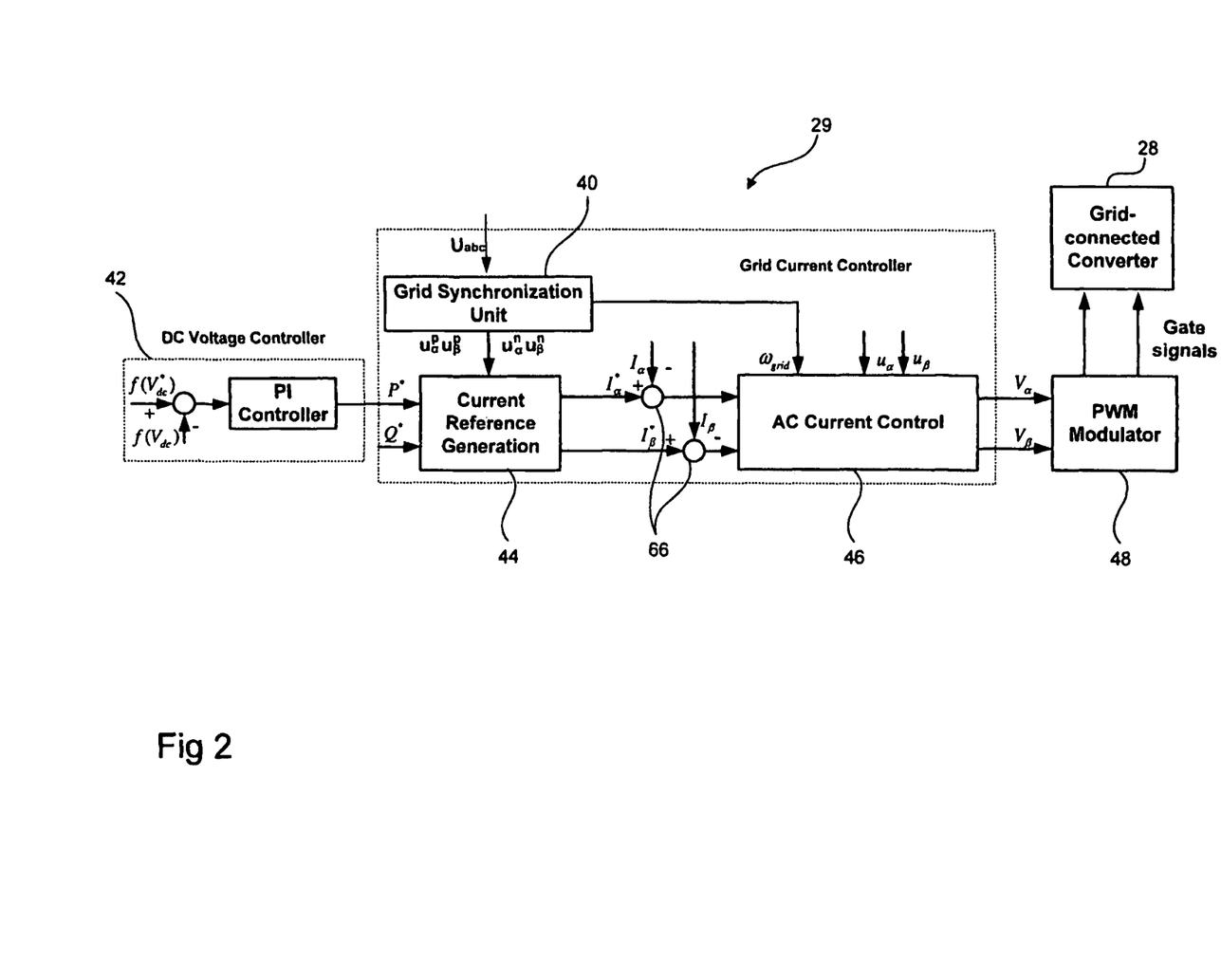
FIG. 2 illustrates a grid-side converter control scheme according to an embodiment of the invention

FIG. 2 illustrates a control unit implementing a grid-side converter control scheme according to an embodiment of the invention. It should be noted that the control unit 29 also includes control functions for controlling other components in the wind turbine generator, in addition to the grid-side converter. The control scheme implemented in the control unit 29 receives as inputs the voltage at the grid input terminals A, which are line voltages, $U_{abc}$, and at the DC link, $V_{DC}$, and provides control signals to the grid-side converter 28 after PWM modulation.

The grid-side converter control scheme has two control loops. A first control loop, implemented by the DC voltage controller 42, is to regulate the DC voltage to its pre-set value. The output of DC link voltage controller is the active power reference or amplitude of the active current reference. A second control loop, implemented by the AC current controller 46, controls the current in a stationary frame. The active power reference/amplitude of the active current reference is regulated by the second control loop such that the power balance can be achieved between machine side converter and grid side converter which in turn results in DC link voltage regulation.

In this embodiment of the invention, a grid synchronization unit 40 provides the positive and negative sequence voltage components $\mu_\alpha^p, \mu_\beta^p, \mu_\alpha^n, \mu_\beta^n$, based on the line voltage $U_{abc}$, and a DC voltage controller 42 provides the active power reference P* based on the DC link voltage $V_{DC}$. A current reference generation unit 44 receives the positive and negative sequence voltage components and the active power reference as inputs and generates a current reference in an α-β stationary frame, $I_\alpha^*$, $I_\beta^*$. An AC current controller 46 thereafter receives the current reference to provide a control voltage $V_\alpha$, $V_\beta$, which is then fed to a PWM modulator 48 for controlling the grid-side DC/AC converter 28 accordingly.

Figure 3:
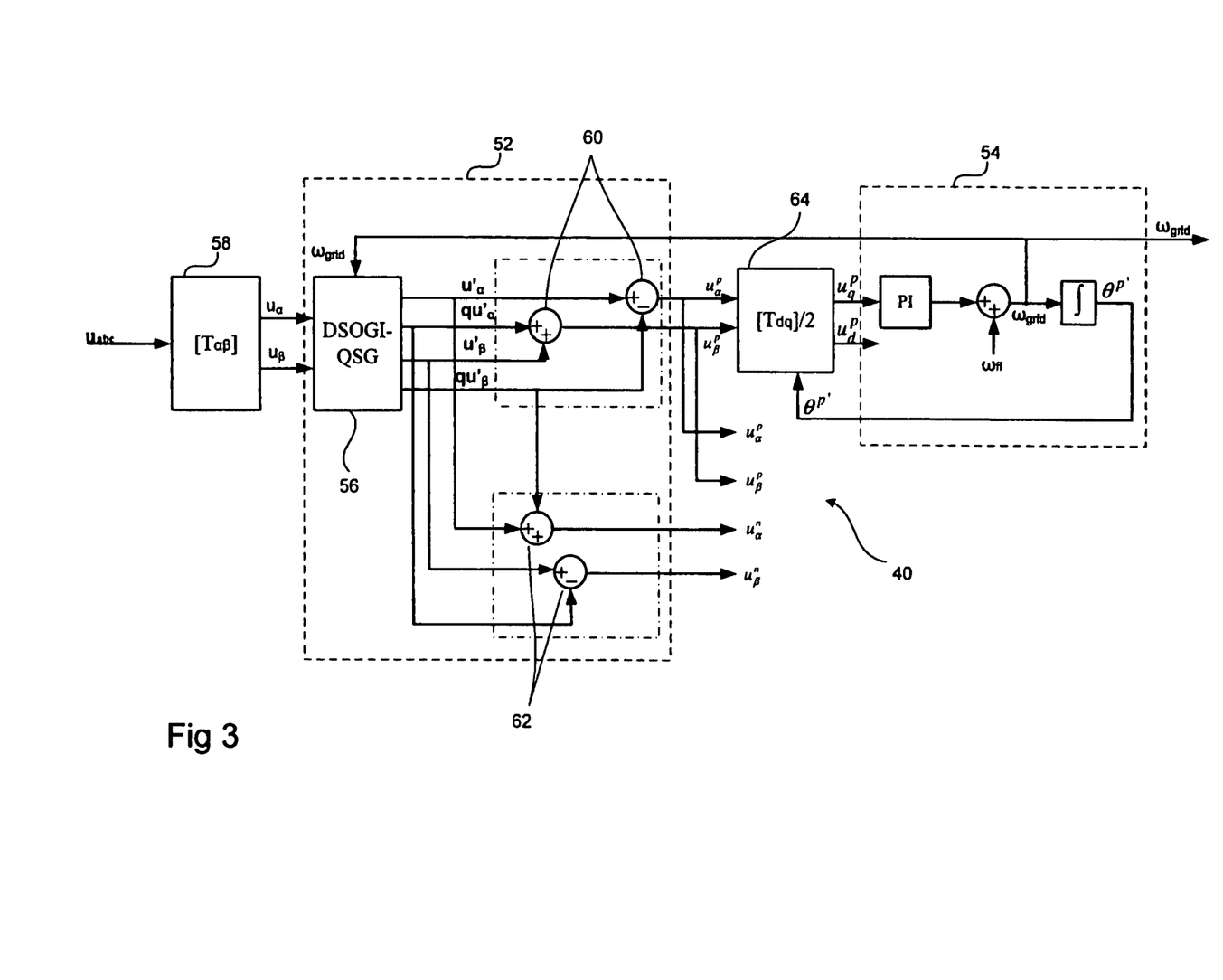
FIG. 3 illustrates a grid synchronization unit of FIG. 2.

FIG. 3 illustrates the grid synchronization unit 40 according to an embodiment of the present invention. The grid synchronization unit 40 includes a voltage sequence component detector 52, primarily comprising a dual second order generalized integrator for quadrature-signals generation (DSOGI-QSG) unit 56 where positive and negative sequence components $\mu_\alpha^p$, $\mu_\beta^p$, $\mu_\alpha^n$, $\mu_\beta^n$, are generated in an α-β stationary coordinate frame, and a grid frequency estimator 54 comprising a phase-locked loop (PLL) setup operating in a synchronously rotating frame (SRF).

The grid synchronization unit 40 also comprises an α-β transformation module 58 for transforming the three-phase line voltage $U_{abc}$ from the natural frame into the α-β stationary frame. The three-phase line voltage $U_{abc}$ is obtained via the measurement unit 30 measuring the current and voltage on grid input terminals A of the wind turbine 10. The above can be similarly applied to the measurement of line currents by the measurement unit 30.

The transformation matrix of the α-β transformation module 58 can be expressed using the expression:

$$\begin{bmatrix} u_\alpha \\ u_\beta \end{bmatrix} = T_{\alpha\beta} \begin{bmatrix} u_a \\ u_b \\ u_c \end{bmatrix} = \frac{2}{3} \begin{bmatrix} 1 & -0.5 & -0.5 \\ 0 & \frac{\sqrt{3}}{2} & -\frac{\sqrt{3}}{2} \end{bmatrix} \begin{bmatrix} u_a \\ u_b \\ u_c \end{bmatrix} \quad (1)$$

where $u_\alpha$ and $u_\beta$ are the voltage components in the α-β stationary frame and $u_a$, $u_b$ and $u_c$ are the three-phase voltage components in the natural frame.

The α-β line voltage reference $U_\alpha$ and $U_\beta$ is then passed to the voltage sequence component detector 52. The DSOGI-QSG unit 56 then filters and obtains a 90° shifted version from the voltages in the α-β frame. These signals from the DSOGI-QSG unit 56 are then input into a positive-sequence calculator 60 and the instantaneous positive sequence voltage in the α-β stationary frame can be expressed using the following equation:

$$u_{\alpha\beta}^p = \frac{1}{2}\begin{bmatrix} 1 & -q \\ q & 1 \end{bmatrix} u_{\alpha\beta}, \quad q = e^{-j\frac{\pi}{2}} \quad (2)$$

where q is a phase-shift operator in the time-domain which obtains the quadrature-phase waveform (90° lag) of the original in-phase waveform.

The shifted outputs from the DSOGI-QSG unit 56 are also provided to a negative-sequence calculator 62 which provides the negative sequence voltage component in the α-β frame expressed using the following equation:

$$u_{\alpha\beta}^n = \frac{1}{2}\begin{bmatrix} 1 & q \\ -q & 1 \end{bmatrix} u_{\alpha\beta}, \quad q = e^{-j\frac{\pi}{2}} \quad (3)$$

In order to ensure the voltage sequence component detector 52 gives rise to precise results under grid frequency variations, there is implemented a close-loop system which allows proper adaptation of the resonance frequency of the detector to actual network conditions. This is also to satisfy operation of the wind turbine 10 in frequency variations. A grid frequency estimator 54 is thus provided, which may comprise a SRF PLL for grid frequency detection and subsequent DSOGI-QSG resonance frequency adaptation. Prior to the positive sequence voltage from the positive-sequence calculator 60 being provided to the grid frequency estimator 54, the positive sequence voltage is first translated from the α-β stationary frame to the d-q rotating reference frame via a d-q transformation module 64, which is provided by the following expression:

$$T_{dq}^p = \begin{bmatrix} \cos\theta^p & \sin\theta^p \\ -\sin\theta^p & \cos\theta^p \end{bmatrix} \quad (4)$$

Within the grid frequency estimator 54, the feedback loop (providing $\theta^{p'}$ to the d-q transformation module 64) regulates the q component to zero, controls the angular position of the d-q reference frame, and obtains the grid frequency $\omega_{grid}$.

The grid frequency $\omega_{grid}$ is provided as an output of the grid synchronization unit 40. The grid frequency $\omega_{grid}$ is also used by an outer feedback loop to dynamically adapt the DSOGI-QSG unit 56 resonant frequency. The grid synchronization unit 40 described in FIG. 3 thus provides a simple and efficient solution of obtaining the positive and negative sequence voltages and the grid frequency $\omega_{grid}$.

Returning to FIG. 2, the DC voltage controller 42 is provided to regulate the DC link voltage $V_{dc}$ in order to act as a reference. This can be achieved by controlling either. $V_{dc}$ or $V_{dc}^2$. Therefore, $f(V_{dc})$ may be used to represent $V_{dc}$ or $V_{dc}^2$ (or any other function of $V_{dc}$). As the value of the DC link voltage is referenced in direct current, a conventional PI controller may be used to regulate the DC link voltage $f(V_{dc})$ based on a desired DC link voltage $f(V_{dc}^*)$, where $f(V_{dc}^*)$ corresponds to the same function acting on $V_{dc}$. The output of the DC control loop is the active power reference P*. PI controllers are well-known in the art and will not be elaborated in this disclosure. The design of the PI parameters is based on requirement of the DC control loop/power loop. Reference of the DC link voltage usually has a pre-set value and could be from the pitch controller (not shown) of the wind turbine, through a suitable communications channel.

In this embodiment, a reactive power reference Q* is also provided. There are many ways to define a reactive power reference, also otherwise known as a reactive power set point. It is possible to decide if the turbine is to operate at a fixed reactive power reference or whether it is to be set dynamically according to a power factor reference. The wind turbine could also be set up for where the reactive power has priority over active power. The reactive power reference could also be an output of the power plant reactive power control. The above described reactive power control is normally used to maintain constant power factor over operation of a group of turbines. In this case, the reactive power control and the group of turbines will be handled by a central load management system, which updates the reactive power reference to the turbines.

Alternatively, instead of providing the active power reference, the active current reference can also be provided. In this case, a reactive current reference would thus be provided instead of the reactive power reference. For convenience, the inputs provided to the current reference generation unit 44 is the active reference P*, comprising the active power reference or the active current reference, and the reactive reference Q*, comprising the reactive power reference or the reactive current reference.

As indicated above, it is desired for the wind turbine 10 to operate under certain grid conditions. This requires understanding the grid conditions and the current wind turbine characteristics at a certain time. This is provided according to the embodiment at least by use of the grid synchronization unit 40 and the DC voltage controller 42. The resultant positive and negative voltage components from the grid synchronization unit 40, $\mu_\alpha^p$, $\mu_\beta^p$, $\mu_\alpha^n$, $\mu_\beta^n$, and the resultant active reference P* from the DC voltage controller 42 are thereafter provided as inputs, together with the reactive reference Q*, to the current reference generation unit 44. This is to provide a reference signal for the operation of the grid-side converter 28, i.e. to operate the wind turbine 10 under the grid conditions.

In an embodiment, the current reference is carried out in the α-β stationary frame. Therefore, complex coordinate transformation (e.g. transformation to the d-q rotating frame) can be avoided.

The current reference can be expressed as follows:

$$\begin{cases} i_\alpha^* = k_1(u_\alpha^p - u_\alpha^n) + k_2(u_\beta^p - u_\beta^n) \\ i_\beta^* = k_1(u_\beta^p - u_\beta^n) + k_2(-u_\alpha^p + u_\alpha^n) \end{cases} \quad (5)$$

where active current reference is $$\begin{cases} i_{\alpha p}^* = k_1(u_\alpha^p - u_\alpha^n) \\ i_{\beta p}^* = k_1(u_\beta^p - u_\beta^n) \end{cases}$$

and reactive power reference is $$\begin{cases} i_{\alpha q}^* = k_2(u_\beta^p - u_\beta^n) \\ i_{\beta q}^* = k_2(-u_\alpha^p + u_\alpha^n) \end{cases}$$

and where $$k_1 = \frac{2}{3}\frac{P^*}{[(u^p)^2 - (u^n)^2]}, \quad k_2 = \frac{2}{3}\frac{Q^*}{[(u^p)^2 - (u^n)^2]} \text{ and}$$

$$u^p = \sqrt{(u_\alpha^p)^2 + (u_\beta^p)^2}, \quad u^n = \sqrt{(u_\alpha^n)^2 + (u_\beta^n)^2}.$$

The current reference is given such that the power drawn from the wind turbine 10 is constant for a fixed wind speed and the current drawn from the wind turbine is sinusoidal but unbalanced.

With the above current reference, instantaneous active power is $$p = \frac{3}{2}(u_\alpha i_\alpha^* + u_\beta i_\beta^*) \quad (6)$$

$$= \frac{P^* u_\alpha(u_\alpha^p - u_\alpha^n)}{[(u^p)^2 - (u^n)^2]} + \frac{Q^* u_\alpha(u_\beta^p - u_\beta^n)}{[(u^p)^2 - (u^n)^2]} +$$

$$\frac{P^* u_\beta(u_\beta^p - u_\beta^n)}{[(u^p)^2 - (u^n)^2]} + \frac{Q^* u_\beta(-u_\alpha^p + u_\alpha^n)}{[(u^p)^2 - (u^n)^2]}$$

$$= \frac{P^*(u_\alpha^p + u_\alpha^n)(u_\alpha^p - u_\alpha^n)}{[(u^p)^2 - (u^n)^2]} + \frac{Q^*(u_\alpha^p + u_\alpha^n)(u_\beta^p - u_\beta^n)}{[(u^p)^2 - (u^n)^2]} +$$

-continued $$\frac{P^*(u_\beta^p + u_\beta^n)(u_\beta^p - u_\beta^n)}{[(u^p)^2 - (u^n)^2]} + \frac{Q^*(u_\beta^p + u_\beta^n)(-u_\alpha^p + u_\alpha^n)}{[(u^p)^2 - (u^n)^2]}$$

$$= P^* + \tilde{Q}$$

Therefore, a constant active power is transferred to the grid side.

The instantaneous reactive power is $$q = \frac{3}{2}(u_\beta i_\alpha^* - u_\alpha i_\beta^*) \quad (7)$$

$$= \frac{P^* u_\beta(u_\alpha^p - u_\alpha^n)}{[(u^p)^2 - (u^n)^2]} + \frac{Q^* u_\beta(u_\beta^p - u_\beta^n)}{[(u^p)^2 - (u^n)^2]} +$$

$$\frac{P^* u_\alpha(u_\beta^p - u_\beta^n)}{[(u^p)^2 - (u^n)^2]} + \frac{Q^* u_\alpha(-u_\alpha^p + u_\alpha^n)}{[(u^p)^2 - (u^n)^2]}$$

$$= Q^* + \tilde{P}$$

For each of the current references, $I_\alpha^*$ and $I_\beta^*$, an error signal is then provided by subtracting the actual current $I_\alpha$ and $I_\beta$ therefrom, using summing units 66. The actual currents, $I_\alpha$ and $I_\beta$, may be obtained from readings of the three-phase line currents performed by the measurement unit 30, and then put through a transformation to the α-β stationary frame, similar to that performed for the line currents as described-above.

Each of the error signals are then fed to the AC current controller 46, which accordingly provides converter control signals $V_\alpha$ and $V_\beta$ to a PWM controller 48 to generate gate signals for control of the grid-side converter 28. The AC current controller 46 also receives as inputs the actual voltage signals $u_\alpha$ and $u_\beta$, as well as the estimated grid frequency $\omega_{grid}$. The PWM controller 48 operates in a manner well known to the skilled person and will not be described in great detail. The PWM controller 48 controls the switches of the grid-side converter 28. The grid-side converter 28 comprises one pair of switches for each phase, which are controlled in a complementary fashion for instance according to a space vector pulse width modulation, (SVPWM), scheme, which is well known in the art.

Returning to the AC current controller 46, under asymmetrical grid voltages, the grid current magnitudes and phase will have to be adjusted such that the required instantaneous power is transferred. According to symmetrical component theory, this will result in unbalanced AC line currents which have both positive and negative sequence components. A simple PI control cannot provide a good performance for unbalanced current regulation. It is worth noting that both positive and negative sequence components become AC terms at a fixed frequency in the stationary α-β frame of reference.

According to an embodiment of the present invention, a Proportional (P)+Resonant Current Control (P+RCC) with an adjustable resonant frequency control scheme is provided as the AC current controller 46. Generally, a P+Resonant controller has a proportional portion and a resonant portion. The resonant portion contributes to the output only for frequencies in the vicinity of a center frequency, which in an embodiment is set to correspond to the frequency of the power grid.

The P+Resonant controller has the capability of completely eliminating an error in an alternating parameter as long as the parameter alternates with a frequency close to the center frequency. Therefore, the need for performing the transformation into a rotary frame is eliminated. Instead, the control may be applied directly on a three phase current or a two-phase transformation (e.g. α-β stationary).

Figure 4A:
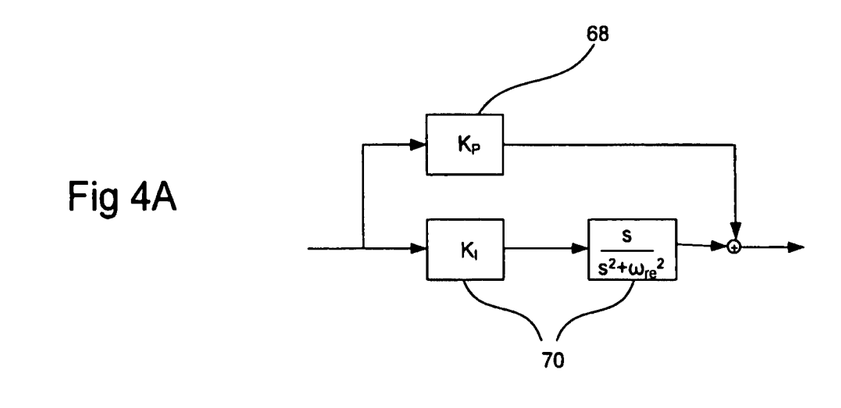
FIG. 4A illustrates schematically a P+Resonant controller.
Figure 4B:
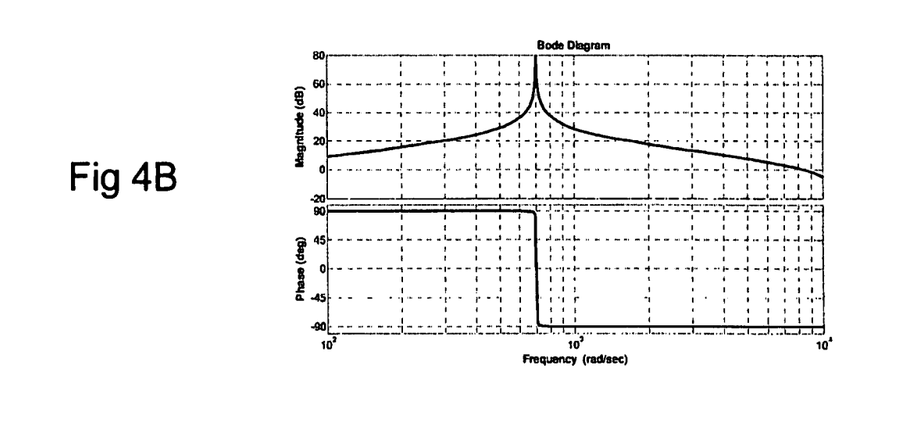
FIG. 4B shows a Bode plot of a P+Resonant controller.

Generally, a P+Resonant controller, which is used as an example here, may be presented as illustrated schematically in FIG. 4A. A Bode plot for the controller is illustrated in FIG. 4B. The controller has a proportional portion 68 and a resonant portion 70. The resonant portion 70 contributes to the output only for frequencies in the vicinity of a center frequency or resonance frequency, $\omega_{re}$, which in the present disclosure corresponds to the frequency of grid current. It may be noted that the schematic layout of the P+Resonant controller in FIG. 4A is a theoretical implementation as a practical implementation requires some form of damping. The transfer function of an ideal P+Resonant controller may be defined as:

$$H_{AC}(s) = K_p + \frac{K_I s}{s^2 + \omega_{re}^2} \quad (8)$$

where $K_P$ and $K_i$ are controller gains and $\omega_{re}$ is the resonance frequency.

The transfer function of a P+Resonant controller, having taking into regard damping, may thus be defined as follows:

$$H_{AC}(s) = K_p + \frac{2 K_I \omega_c s}{s^2 + 2\omega_c s + \omega_{re}^2} \quad (9)$$

where $\omega_e$ is the damping factor.

This controller has the capability of completely eliminating an error also in an alternating parameter as long as the parameter alternates with a frequency close to $\omega_{re}$. Therefore, the need for performing the transformation into a rotary frame may be eliminated. Instead, control may be applied directly on a three phase current or a two-phase transformation thereof. At the same time the resonance frequency parameter $\omega_{re}$ is fed to the controller. $K_P$ and $K_I$ may be constants or may be varied in accordance with the resonance frequency to achieve different dynamic properties.

By bilinear transformation the discrete version of the controller in Eq. (9) is shown in Eq. (10).

$$H_{AC}(z) = H_{AC}(s)\big|_{s=\frac{2}{T_s}\frac{z-1}{z+1}} \quad (10)$$

$$= \frac{r_2 z^2 + r_1 z + r_0}{z^2 + c_1 z + c_0}$$

$$= \frac{r_2 + r_1 z^{-1} + r_0 z^{-2}}{1 + c_1 z^{-1} + c_0 z^{-2}}$$

where $\omega_e$ the discrete controller coefficients are given in Eq. (11):

$$c_1 = \frac{2\omega_{grid}^2 - 2\left(\frac{2}{T_s}\right)^2}{\left(\frac{2}{T_s}\right)^2 + 2\omega_c\left(\frac{2}{T_s}\right) + \omega_{grid}^2}, \quad c_0 = \frac{\left(\frac{2}{T_s}\right)^2 - 2\omega_c\left(\frac{2}{T_s}\right) + \omega_{grid}^2}{\left(\frac{2}{T_s}\right)^2 + 2\omega_c\left(\frac{2}{T_s}\right) + \omega_{grid}^2} \quad (11)$$

$$r_2 = \frac{2\omega_c\left(\frac{2}{T_s}\right) K_i}{\left(\frac{2}{T_s}\right)^2 + 2\omega_c\left(\frac{2}{T_s}\right) + \omega_{grid}^2}, \quad r_0 = \frac{-2\omega_c\left(\frac{2}{T_s}\right) K_i}{\left(\frac{2}{T_s}\right)^2 + 2\omega_c\left(\frac{2}{T_s}\right) + \omega_{grid}^2}$$

$$r_1 = 0$$

Figure 5:
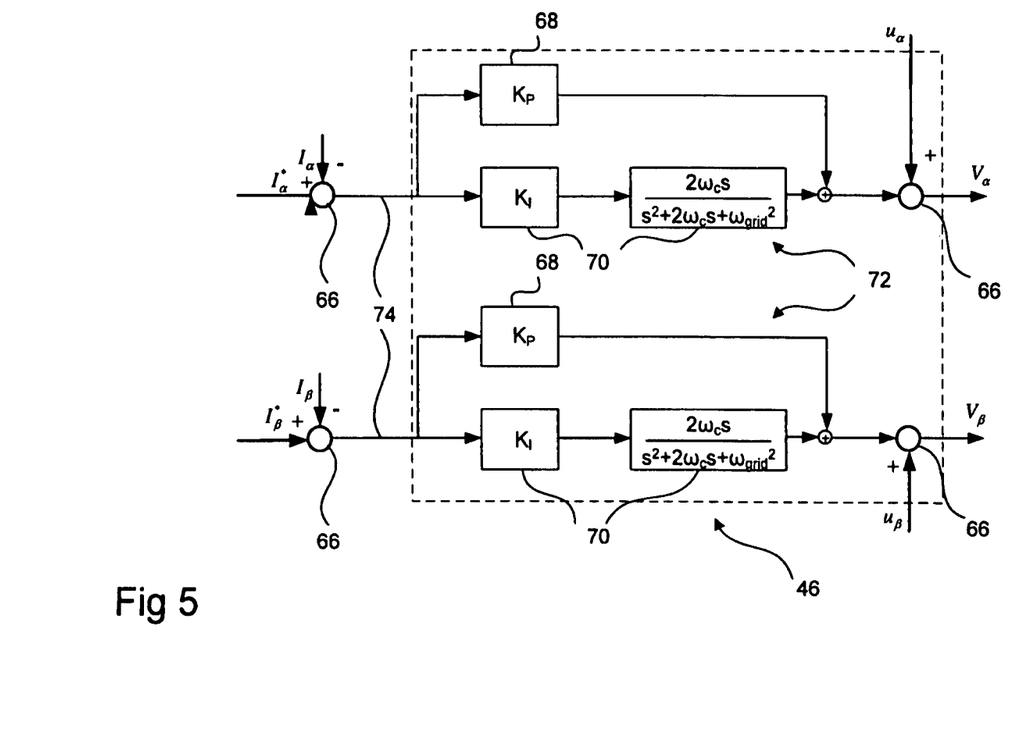
FIG. 5 illustrates schematically a P+Resonant controller of FIG. 2.

Referring to FIG. 5, the AC current controller 46 is represented schematically in an embodiment with P+Resonant controllers. The AC current controller 46 comprises of 2 P+RCC controllers 72 to determine the α and β components of the control voltage. Each P+RCC controller receives an error signal 74 which is obtained by subtracting the actual currents $I_\alpha$ and $I_\beta$ from the current references $I_\alpha^*$ and $I_\beta^*$ using summing units 66. It may be noted that each P+RCC controller 72 has its own proportional portions 68 and resonant portions 70 and operates with the transfer function as defined above in equation (9). The grid frequency $\omega_{grid}$ is provided to the AC current controller 46 from the grid synchronization unit 40, and is utilized as the center frequency for operation ($\omega_{re}$). The line voltages $u_\alpha$ and $u_\beta$ are also provided to the AC current controller 46 as feed-forward inputs and are added to the resultant signals using summing units 66 to provide the control voltages $V_\alpha$ and $V_\beta$ which are thereafter fed to a PWM modulator 48 for controlling the grid-side converter 28 accordingly.

In alternative embodiments of the present invention, there may be other implementations of the AC current controller 46. For example, a digital repetitive current control scheme which has been adapted to adjust according to frequency variation could be used. Another implementation could be an integral variable structure control which has an integral augmented (PI-type) switching surface. Alternatively, an iterative learning control based hybrid current controller could be used as the AC current controller 46.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art. The scope of the invention is thus indicated by the appended claims and all changes which come within the meaning and range of equivalency of the claims are therefore intended to be embraced.

Furthermore, embodiments described in the context of the method described are analogously valid for the apparatus and the computer readable medium.

The invention claimed is:

1. A method of controlling a power converter for a wind turbine generator, the power converter including a direct current (DC) link having a DC link voltage, the power converter operatively coupled with a power grid at a connection point, the method comprising:
   determining an alternating current (AC) line voltage at the connection point;
   determining an estimated grid frequency value of the power grid based on the determined AC line voltage;
   dynamically adapting the determined AC line voltage to the estimated grid frequency value;
   generating, using a feedback controller, an active power reference based on a difference between a first result of a function obtained using the DC link voltage, and a second result of the function obtained using a reference DC voltage;
   generating a current reference signal based on at least the adapted AC line voltage and the active power reference; and
   determining, without performing a coordinate transformation, and based on the grid frequency value and an error signal representing a difference between the current reference signal and a measured AC current at the connection point, a converter control signal for controlling the power converter to generate power at the frequency of the power grid.

2. The method according to claim 1, wherein the determination of the converter control signal is carried out in a stationary coordinate frame.

3. The method according to claim 1, wherein the reference signal comprises AC signals.

4. The method according to claim 1, wherein the converter control signal is provided by a P+Resonant current controller with varying resonant frequency.

5. The method according to claim 4, further comprising varying the resonant frequency of the P+Resonant current controller with the estimated grid frequency value.

6. The method according to claim 1, wherein generating the current reference signal is further based on a reactive reference.

7. The method according to claim 1, wherein the feedback controller is a PI controller.

8. The method according to claim 1, wherein the active reference is one of an active power reference and an active current reference.

9. The method according to claim 8, wherein the positive sequence and negative sequence components are determined using an integrator and the grid frequency is generated using a Phase-Locked Loop (PLL).

10. The method according to claim 9, wherein the positive and negative sequence components are determined with a dual second order generalized integrator for quadrature signals generation.

11. The method according to claim 1, wherein dynamically adapting the determined AC line voltage to the determined grid frequency value comprises determining positive sequence components and negative sequence components of the AC line voltage.

12. The method according to claim 11, wherein generating the current reference signal is further based on the positive sequence components and the negative sequence components.

13. The method according to claim 12, wherein generating the current reference is performed in an α-β stationary coordinate frame.

14. The method of claim 13, wherein generating the current reference signal is further based on a reactive reference, and is determined according to:

$$i_\alpha^* = k_1(u_\alpha^p - u_\alpha^n) + k_2(u_\beta^p - u_\beta^n)$$
$$i_\beta^* = k_1(u_\beta^p - u_\beta^n) + k_2(-u_\alpha^p - u_\alpha^n),$$

wherein $i_\alpha^*$ and $i_\beta^*$ represent the current reference signal, $u_\alpha^p$ and $u_\beta^p$ represent the positive sequence components, and $u_\alpha^n$ and $u_\beta^n$ represent the positive sequence components, and wherein $k_1$ is based on the active reference and $k_2$ is based on the reactive reference.

15. The method of claim 14, wherein $k_1$ and $k_2$ are determined according to:

$$k_1 = \frac{2}{3}\frac{P^*}{(u^p)^2 - (u^n)^2}$$
$$k_2 = \frac{2}{3}\frac{Q^*}{(u^p)^2 - (u^n)^2},$$

wherein P* and Q* respectively represent the active reference and the reactive reference, and wherein $u^p=\sqrt{(u_\alpha^p)^2+(u_\beta^p)^2}$ and $u^n=\sqrt{(u_\alpha^n)^2+(u_\beta^n)^2}$.

16. The method according to claim 1, wherein the converter control signal is passed to a pulse-width-modulation (PWM) module before being provided to the power converter.

17. The method of claim 1, wherein generating a current reference signal based on at least the frequency-adapted AC line voltage comprises:
  generating two current references in an α-β stationary coordinate frame, each current reference reflecting a respective one of α and β current reference components;
  transforming the actual AC current obtained into the α-β stationary coordinate frame to produce α and β actual current components; and
  generating two error signals by subtracting each of the α and β actual current components from the corresponding α and α current reference components.

18. The method of claim 1, wherein the function includes squaring the corresponding voltage value.

19. A wind turbine generator operatively coupled with a power grid, the wind turbine generator comprising:
  an electrical generator;
  a power converter including a direct current (DC) link having a DC link voltage, the power converter connected at a connection point between the electrical generator and the power grid;
  a measurement unit configured to determine an alternating current (AC) line voltage at the connection point;
  a feedback controller configured to generate an active power reference based on a difference between a first result of a function obtained using the DC link voltage, and a second result of the function obtained using a reference DC voltage; and
  a control unit coupled with the measurement unit and the feedback controller and configured to control the power converter, the control unit including:
    a grid synchronization unit configured to determine an estimated grid frequency value of the power grid based on the determined AC line voltage,
    a current reference generation unit configured to generate a current reference signal based on at least the determined AC line voltage and the active power reference; and
    an AC current control unit configured to:
      receive an error signal representing a difference between the current reference signal and a measured AC current at the connection point, and
      generate, without performing a coordinate transformation, and based on the grid frequency value and the received error signal, a converter control signal for the power converter.

20. A computer readable non-transitory medium having a computer program recorded thereon, the computer program comprising instructions which, when executed by a processor, cause the processor to perform an operation for controlling a power converter for a wind turbine generator, the power converter including a direct current (DC) link having a DC link voltage, the power converter operatively coupled with a power grid at a connection point, the operation comprising:
  determining an alternating current (AC) line voltage at the connection point;
  determining an estimated grid frequency value of the power grid based on the AC line voltage;
  generating an active power reference based on a difference between a first result of a function obtained using the DC link voltage, and a second result of the function obtained using a reference DC voltage;

generating a current reference signal based on at least the AC line voltage and the active power reference; and determining, without performing a coordinate transformation, and based on the grid frequency value and an error signal representing a difference between the current reference signal and a measured AC current at the connection point, a converter control signal for controlling the power converter.

* * * * *